US012807189B1

(12) United States Patent
Bosse et al.

(10) Patent No.: US 12,807,189 B1
(45) Date of Patent: Nov. 24, 2026

(54) DETERMINING OBJECT STATE BASED ON WEIGHTED DISTRIBUTIONS

(71) Applicant: Zoox, Inc., Foster City, CA (US)

(72) Inventors: Michael Carsten Bosse, Templeton, CA (US); Shuangting Liu, Foster City, CA (US); Francesco Papi, Oakland, CA (US); Qian Song, San Francisco, CA (US); Zachary Sun, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 172 days.

(21) Appl. No.: 18/525,640

(22) Filed: Nov. 30, 2023

(51) Int. Cl.

| | |
|---|---|
| ***B60W 60/00*** | (2020.01) |
| ***G06V 10/80*** | (2022.01) |
| ***G06V 10/82*** | (2022.01) |
| ***G06V 20/56*** | (2022.01) |
| ***G06V 20/58*** | (2022.01) |

(Continued)

(52) U.S. Cl.
CPC ......... *B60W 60/0027* (2020.02); *G06V 10/80* (2022.01); *G06V 10/82* (2022.01); *G06V 20/56* (2022.01); *G06V 20/58* (2022.01); *G05D 2101/10* (2024.01); *G05D 2101/15* (2024.01)

(58) Field of Classification Search
CPC ......... B60W 30/0956; B60W 60/0027; B60W 60/0017; B60W 60/00276; B60W 40/04; B60W 2420/408; B60W 2554/00; G05D 1/0088; G05D 1/0221; G05D 1/024; G05D 1/0231; G05D 1/0027; G05D 1/0248; G05D 1/0253; G05D 1/0255; G05D 1/246; G05D 1/692; G05D 1/633; G05D 2101/10; G05D 2101/15; G05D 2111/10; G06V 20/58; G06V 20/56; G06V 20/64; G06V 10/82; G06V 10/80; G06T 2207/30252; G06T 2207/10028; G06T 2207/20084; G06T 2207/20081; G06T 2207/30261; G06T 2207/10016; G06T 2207/10044; G06T 2207/30236; G06T 7/521; G06T 7/20; G06T 7/143
See application file for complete search history.

(56) References Cited

U.S. PATENT DOCUMENTS

| | | | | |
|---|---|---|---|---|
| 10,102,636 | B2 * | 10/2018 | Murata | G06T 7/277 |
| 11,210,537 | B2 * | 12/2021 | Koivisto | G01S 7/417 |
| 2021/0139023 | A1 * | 5/2021 | Crego | G06V 20/584 |

(Continued)

*Primary Examiner* — Mohamad O El Sayah
*Assistant Examiner* — Noah W Stiebritz
(74) *Attorney, Agent, or Firm* — Lee & Hayes, P.C.

(57) ABSTRACT

Techniques for determining a predicted state of an object in a vehicle environment may include determining, based on first sensor data, first context data; determining, based on the first context data, first output data representing a first weight for a first probability distribution associated with a first predicted state of the object, and a second weight for a second probability distribution associated with a second predicted state of the object; determining, based on second sensor data, second context data; determining, based on the first output data and the second sensor data, second output data representing a third weight for a third probability distribution associated with a third predicted state of the object, and a fourth weight for a fourth probability distribution associated with a fourth predicted state of the object; and controlling the vehicle based on the second output data.

21 Claims, 5 Drawing Sheets

(51) Int. Cl.
*G05D 101/10* (2024.01)
*G05D 101/15* (2024.01)

(56) References Cited

U.S. PATENT DOCUMENTS

2021/0200221 A1* 7/2021 Omari .................. G05D 1/0088
2022/0126864 A1* 4/2022 Moustafa .......... B60W 60/0013
2023/0162486 A1* 5/2023 Huang .................. G06F 18/217
382/159

* cited by examiner

DETERMINING OBJECT STATE BASED ON WEIGHTED DISTRIBUTIONS

BACKGROUND

A vehicle may be equipped with various systems to detect objects in an environment and use detection information to control the vehicle to avoid the objects. Detected objects may include objects in motion or that may potentially be in motion, such as other vehicles, bicycles, pedestrians, etc. In order to plan trajectories and safely navigate around objects in the environment, a vehicle's trajectory planning system may determine the presence and/or various attributes of such objects, including position, heading, yaw, velocity, and/or acceleration.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
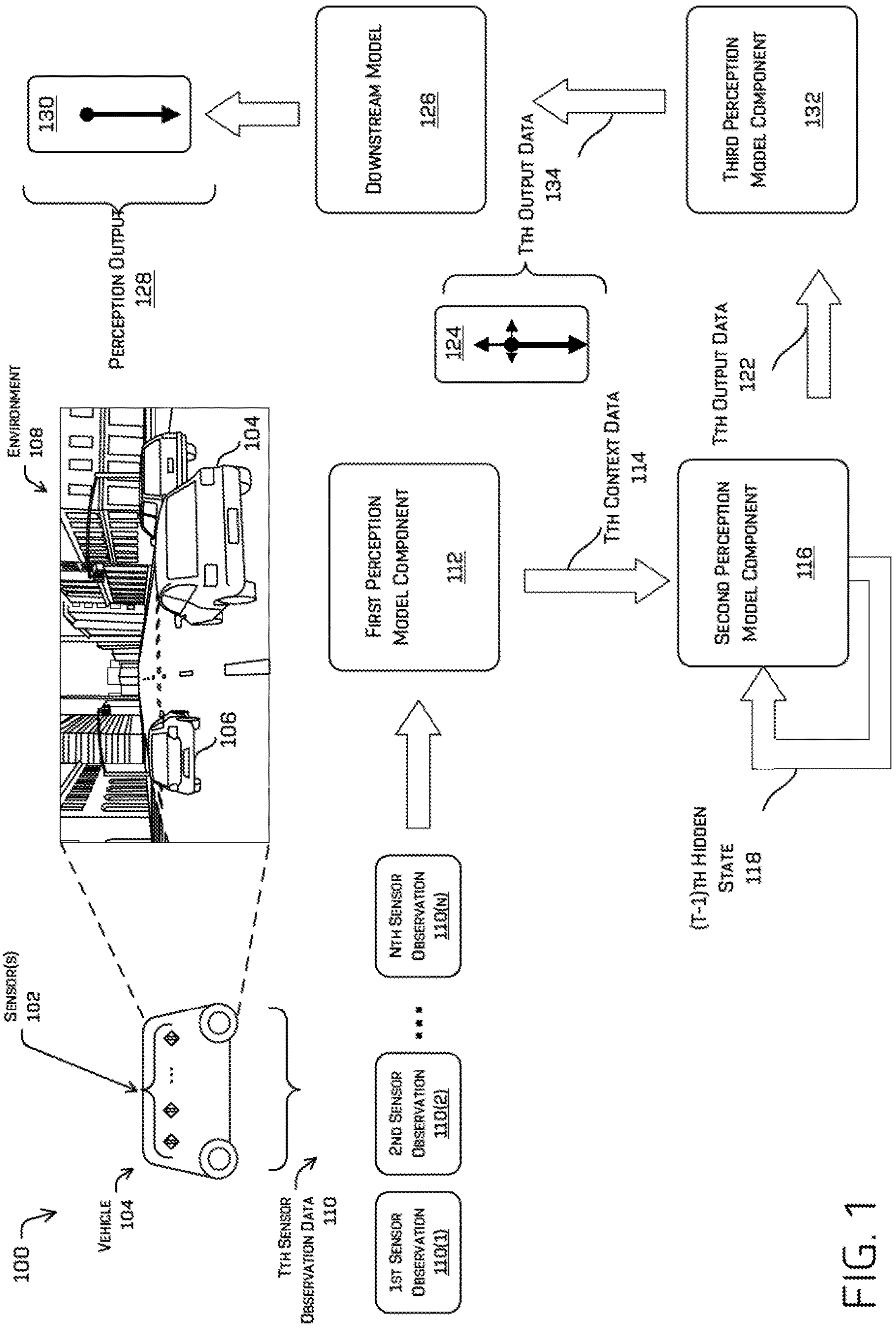
FIG. 1 illustrates an example architecture for determining and/or updating a perception output using sensor data captured by one or more sensors of a vehicle.

This document describes techniques for determining a perception output for a vehicle by using a model that is configured to determine a set of M probability distributions about the predicted state of an object in the vehicle environment. In some cases, the model is configured to determine, based on sensor data associated with the vehicle environment, a set of M probability distributions each associated with one of M weights. For example, the model may be configured to determine a Gaussian mixture model that describes M hypotheses about the predicted state of an object in the vehicle environment.

In some cases, the techniques described herein enable a computing device (e.g., a vehicle computing device deployed on a vehicle and/or a remote server device that communicates with a vehicle computing device) to detect features associated with an object in the vehicle environment more accurately (e.g., with a higher degree of correspondence with ground-truth data, for example as determined based on a precision and/or recall measure) and use these more accurate detections to generate vehicle trajectories that are more cognizant of the obstacles and/or constraints in the vehicle environment. Accordingly, the techniques discussed herein may improve the safety of occupants of a vehicle that incorporates the techniques discussed herein. Moreover, the techniques may improve the efficiency of a vehicle, such as an autonomous vehicle, in accomplishing a mission such as, for example, delivering passengers and/or cargo, surveying a region, or the like.

In some cases, the techniques described herein include using a perception model that is configured to: (i) receive input data representing an environment, and (ii) process the input data to determine a set of M probability distributions (e.g., two or more probability distributions) about the predicted state of an object in the vehicle environment. Such a perception model is referred to herein as a "multi-modal perception model." An example of a multi-modal perception model is a model that includes a mixture density network (MDN). However, while various techniques described herein are described with reference to a MDN, a person of ordinary skill in the relevant technology will recognize that any other multi-modal perception model (e.g., any model that is configured to determine a set of M probability distributions about a predicted state of an environment) may be utilized, where M is any integer greater than 1. In some cases, a recurrent multi-modal perception model, such as a recurrent MDN, may be utilized, as further described below.

In some cases, a multi-modal perception model is configured to determine a set of M probability distributions about the predicted state of an object, along with a respective weight for each of the M probability distributions. In some cases, M is a hyper-parameter of the multi-modal perception model, such as a hyper-parameter that is set during the model's inference and/or training. In some cases, the multi-modal perception model: (i) at a first time and based on sensor data associated with the first time, determines M probability distributions about the predicted state of an object and determines a weight for each probability distribution, (ii) at a second time and based on sensor data associated with the second time, updates one or more of the M probability distributions and/or one or more of the M weights based on the sensor data. In some cases, the multi-modal perception model may repeat the operation (ii) at each subsequent time until a terminating condition is reached (e.g., until the object is no longer of interest, until the object is no longer visible, until the object is determined to be relevant to the vehicle performing a maneuver and/or determining a trajectory, and/or the like).

For example, in some cases, the multi-modal perception model may, at a first time and based on sensor data associated with the first time, detect an object (e.g., another vehicle) in the environment. The multi-modal perception model may also use the sensor data to determine M probability distributions about a predicted state (e.g., at least one of a position, an orientation, or an angular movement) associated with the object as well as a weight for each of the M probability distributions. The multi-modal perception model may then provide the M probability distributions and/or the M weights to a downstream model that may be configured to determine a first conclusion about the predicted state of the object based on the M probability distributions and/or the M weights. Afterward, at a second time and based on the sensor data associated with the second time, the multi-modal perception model may be configured to update the M probability distributions and/or the M weights (e.g., to reflect detections and/or inferences determined based on the newly-received sensor data). The multi-modal perception model may provide the M updated probability distributions and/or the M updated weights to the downstream model that may be configured to determine a first conclusion about the predicted state of the object based on the M updated probability distributions and/or the M updated weights. As described above, this iterative process may be received based on newly-received sensor data associated with one or more subsequent iterations until a terminating condition is reached.

In some cases, a probability distribution by the multi-modal perception model is a probability distribution defined on one or more random variables related to one or more features associated with an object in an environment. For example, the probability distribution may be a distribution (e.g., a Gaussian distribution) that defines at least one of a central tendency measure (e.g., a mean) or a variability measure (e.g., a variability) for a random variable related to one or more features associated with an object in an environment. For example, the random variable may represent: (i) at least one of a horizontal position parameter, a vertical position parameter, or longitudinal position parameter associated with the object, (ii) at least one of a horizontal velocity parameter, a vertical velocity parameter, or longitudinal velocity parameter associated with the object, and/or (iii) at least one of a yaw parameter, a pitch parameter, or a roll parameter associated with the object. In some cases, the probability distribution is defined over multiple random variables and represents, for each of those random variables, at least one of a central tendency measure or a variability measure.

In some cases, the multi-modal perception model determines output data representing M probability distributions about a predicted state of an environment. The predicted state may be defined over a state space defined with one or more variables. For example, a variable may represent: (i) at least one of a horizontal position parameter, a vertical position parameter, or longitudinal position parameter associated with the object, (ii) at least one of a horizontal velocity parameter, a vertical velocity parameter, or longitudinal velocity parameter associated with the object, and/or (iii) at least one of a yaw parameter, a pitch parameter, or a roll parameter associated with the object. In some cases, the state space is defined by a heading parameter.

In one example, a multi-modal perception model may determine M weights for M different distributions about an orientation of an object in the environment. For example, a first distribution associated with a first weight may represent a first hypothesized orientation associated with the object, a second distribution associated with a second weight may represent a second hypothesized orientation associated with the object, and so on. As described above, as new sensor data arrives, the hypothesized orientations and/or the weights may change. In some cases, as the multi-modal perception model generates new orientations and/or new weights, the multi-modal perception model may provide such data to a downstream perception model that may determine a conclusion about the object's orientation based on the data received from the multi-modal perception model. For example, the downstream perception model may select a hypothesized orientation having the highest weight as the determined orientation associated with the object. As another example, the downstream perception model may select a hypothesized orientation having the highest weight as the determined orientation associated with the object if the highest weight exceeds a threshold.

In some cases, the multi-modal perception model is a recurrent model. For example, the multi-modal perception model may include a recurrent MDN. In some cases, a recurrent multi-modal perception model is configured to, at a given timestep, determine output data (e.g., M probability distributions and/or M weights associated with the M probability distributions) associated with the given timestep based on: (i) sensor data associated with the timestep, and (ii) output data associated with a previous timestep (e.g., output data associated with an immediately preceding timestep). For example, the recurrent multi-modal perception model is configured at, a tth timestep (e.g., where $t>1$), determine the output data associated with the tth timestep based on: (i) sensor data associated with the tth timestep, and (ii) output data associated with the $(t-1)$th timestep.

In some cases, the recurrent multi-modal perception model is configured to, at a first timestep after detection of an object, determine, based on sensor data associated with the timestep, output data associated with the timestep. In some cases, the recurrent multi-modal perception model is configured, at each timestep after the first timestep, determine based on the sensor data associated with the timestep and the output data associated with a preceding timestep, output data associated with a timestep. Outputting data associated with a timestep may include at least one of: (i) M probability distributions about the predicted state of the object, and (ii) M weights associated with the M probability distributions.

In some cases, the inputs to the recurrent multi-modal perception model include a hidden state input and a sensor-based input. In some cases, the sensor-based input associated with each timestep is determined based on sensor data associated with the timestep. In some cases, the hidden state input associated with a first timestep (e.g., a first timestep associated with and/or after the detection of the object of interest) is a predefined vector (e.g., an all-zero vector). In some cases, the hidden state input associated with each timestep after the first timestep is determined based on the output of the multi-modal perception model associated with a previous timestep (e.g., associated with an immediately preceding timestep).

In some cases, input data to the multi-modal perception model may include data determined based on sensor data associated with an environment. Such sensor-based input data may be determined based on one or more sensor observations. In some cases, a sensor observation may represent a detection of at least one object in the vehicle environment in sensor data obtained from one or more sensors associated with the vehicle. In some cases, a sensor observation represents a portion of sensor data obtained from a sensor at a particular time that is predicted to depict an object. In some cases, a sensor observation is determined based on processing sensor data associated with an environment using one or more models, such as an object detection and/or a track detection model.

In some cases, sensor observations determined based on sensor data for a vehicle environment include at least one of the following: one or more single-modality observations or one or more cross-modality observations. In some cases, a single-modality observation may be a sensor observation that is determined based on sensor data associated with a single sensor modality, for example by detecting an object in a region of the sensor data associated with the single sensor modality. Examples of sensor modalities include lidar, radar, sonar, and/or an image sensor (e.g., an image sensor including at least one of a visible light spectrum camera, a depth camera, an infrared camera, and/or the like).

In some cases, a cross-modality observation may be a sensor observation that is determined based on sensor data associated with more than one sensor modality. In some cases, given a set of sensor modalities associated with the sensors of a vehicle, the sensor data captured by at least two (e.g., all) of the described sensor modalities at a first time may be collectively processed by a machine learning model (e.g., a deep tracking network machine learning model) to determine a set of cross-modality observations for the respective vehicle environment. For example, in some cases, at least two of sensor data captured by a lidar sensor at a first time, sensor data captured by a radar sensor at the first time, sensor data captured by a sonar sensor at the first time, or sensor data captured by an image sensor at the first time may be collectively processed to determine a set of cross-modality observations for the respective vehicle environment.

In some cases, inputs to a multi-modal perception model include input data determined by processing a set of sensor observations using an encoder perception model. For example, in some cases, the encoder perception model may be an attention-based model that uses an attention mechanism (e.g., a self-attention mechanism) to process the set of sensor observations to determine context data (e.g., a context vector). In some cases, the context data represents a state of the environment as determined by different observations (e.g., different observations associated with different sensor modalities). In some cases, the encoder perception model is configured to process a set of sensor observations associated with a set of sensor modalities using an attention mechanism (e.g., a self-attention mechanism) to determine context data (e.g., a context vector).

In some cases, the multi-modal perception model architecture provides the ability to reliably process observations from different sensor modalities in varying permutations and combinations. Even if data across modalities is incomplete and/or inconsistent, the model may leverage its attention mechanism to process the available observations in context to make accurate predictions. This may enable robust performance in diverse real-world conditions compared to single-modality approaches limited to the sensor data associated with only one sensor type. Additionally, because the encoder perception model, multi-modal perception model, and downstream model can be trained end-to-end, those components can holistically optimize over time to improve prediction accuracy. Accordingly, while sensor data availability and quality may vary, the model may be able to focus on relevant observations and learn to generate more precise state predictions.

In some cases, during a timestep, the encoder perception model is configured to receive a set of sensor observations associated with the timestep to determine context data associated with the timestep. In some cases, during the timestep, the multimodal perception model is configured to process the context data associated with the timestep (e.g., along with the output data generated by the multi-modal perception model during a previous timestep, such as during an immediately preceding timestep) to generate the output data associated with the timestep. In some cases, during the timestep, a downstream perception model is configured to process the output data generated by the multi-modal perception model in association with the timestep to generate a conclusion about the predicted state of the object in association with the timestep.

In some cases, during a first timestep associated with the detection of an object: (i) the encoder perception model is configured to process a set of sensor observations associated with the first timestep to determine context data associated with the first timestep, (ii) the multi-modal perception model is configured to process the context data associated with the first timestep (e.g., along with predefined hidden state data) to determine output data associated with the first timestep, and/or the (iii) the downstream perception model is configured to process the output data associated with the first timestep to determine a conclusion about a predicted state of the object in association with the first timestep. In some cases, during each timestep after the first timestep: (i) the encoder perception model is configured to process a set of sensor observations associated with the timestep to determine context data associated with the first timestep, (ii) the multi-modal perception model is configured to process the context data associated with the first timestep along with predefined hidden state data (e.g., determined based on output data generated by the multi-modal perception model in association with a previous timestep) to determine output data associated with the timestep, and/or the (iii) the downstream perception model is configured to process the output data associated with the timestep to determine a conclusion about a predicted state of the object in association with the timestep. A conclusion about the predicted state of the object, as determined in association with a timestep by the downstream perception model, may represent at least one of: (i) whether the predicted state of the object associated with the timestep can be determined based on the output data associated with the timestep as generated by the multi-modal perception model, or (ii) the prediction state of the object associated with the timestep as determined based on the output data associated with the timestep as generated by the multi-modal perception model.

In some cases, a set of models including at least two of the encoder perception model, the multi-modal perception model, or the downstream perception model is trained end-to-end. For example, the set of models may be trained by providing T sensor observation sets associated with T times to a pipeline including the three models to obtain T conclusions about the predicted state of the object by the downstream perception model. The T conclusions may be compared with target data representing ground-truth predicted object states associated with the T times to determine an error function. The parameters of the set of models may then be updated to optimize (e.g., locally and/or globally minimize) the error function. In some cases, the set of models is trained in an end-to-end manner using gradient descent with backpropagation through time. In some cases, even though the set of models is trained end-to-end, the three models may be evaluated and/or validated separately. For example, the models may be trained as a unit but validated separately using separate validation sets. In some cases, a first validation score is generated for the multi-modal perception model and the encoder perception model, while a second validation score is generated for the downstream perception model.

In some cases, the output data generated by the multi-modal perception model during a timestep may be based on default (e.g., all zero) context data provided to the multi-modal perception model, such as an all-zero context vector. For example, if during a timestep the encoder perception model fails to generate context data for the multi-modal perception model (e.g., due to a sensor failure), the multi-modal perception model may instead process default context data, such as an all-zero context vector. If the multi-modal perception model processes default context data rather than context data generated by the encoder perception model, the output generated by the multi-modal perception model during that timestep may not depend on current sensor observations. In such cases, the multi-modal perception model may function as a motion model to predict a state of the object based on learned motion dynamics rather than instantaneous sensor inputs. In some cases, when provided with default context data, the recurrent connections within the multi-modal perception model enable the model to update its internal state based on previous outputs to propagate a hidden state representation of the object's motion. Thus, the multi-modal perception model may in some cases be utilized as a motion model that predicts future states based on learned object dynamics when current sensor data is unavailable.

In some cases, the techniques discussed herein can be implemented to facilitate and/or enhance safety of automated navigation features in vehicles, such as in automated vehicles or semi-automated vehicles. For example, the techniques can be used to determine a recommended trajectory for an autonomous vehicle based on objects associated with the vehicle environment and control the autonomous vehicle based on the recommended trajectory. As another example, the techniques can be used to determine that a current trajectory of a vehicle is likely to collide with an object that is within the environment of the vehicle. Upon determining that the current trajectory is likely to collide with an object, the driver of the vehicle may be stopped from following the current trajectory and/or the driver of the vehicle may be alerted about the likelihood of collision. In some cases, upon determining that the current trajectory of an autonomous vehicle is likely to collide with an object in the autonomous vehicle environment, the driver of the autonomous vehicle may be alerted to exercise manual control of the autonomous vehicle.

In some cases, the techniques discussed herein can be implemented in a multi-sensor system, such as a multi-sensor system including image sensor(s) (e.g., RGB cameras), depth cameras (e.g., RGB D cameras (e.g., time-of-flight cameras)), lidar sensors, radar sensors, and/or sonar sensors, to reduce the effect of hardware or software failures. For example, in the event that a first sensor is occluded or broken, the techniques discussed herein can be used to reduce the effect of this event by enabling effective and accurate inferences across sensors. Thus, the techniques discussed herein provide additional improvements to object detection and/or computer vision systems, for example.

In some cases, the techniques described herein can be implemented to improve the accuracy of operation detections generated by object detection systems, and thus improve accuracy and operational effectiveness of such systems. For example, in some cases, by implementing techniques for performing object detection by using a recurrent multi-modal perception model (e.g., with a multi-modal MDN), an object detection system can generate more effective object detection outputs for a vehicle environment. In some cases, the techniques described herein enable object detection based on predictive inferences across sensor modalities and/or across time, thus further increasing the accuracy and operational effectiveness of performing object detection by an object detection system.

The methods, apparatuses, and systems described herein can be implemented in a number of ways. Example implementations are provided below with reference to the following figures. Although discussed in the context of a vehicle, the methods, apparatuses, and systems described herein can be applied to a variety of systems using computer vision techniques and are not limited to vehicles. Moreover, although various computer vision operations are described as being performed by a perception component of a vehicle computing device, a person of ordinary skill in the relevant technology will recognize that the perception component may be deployed on other computing devices, such as on a remote computing device that communicates with a vehicle computing device using a networked connection.

FIG. 1 illustrates an example architecture 100 for determining and/or updating a perception output 128 using sensor data captured by one or more sensors 102 of a vehicle 104. The perception output 128 may be a conclusion about the predicted state of an object (e.g., the vehicle 106) in the vehicle environment 108. The predicted state may represent one or more of: (i) at least one of a horizontal position parameter, a vertical position parameter, or longitudinal position parameter associated with the vehicle 106, (ii) at least one of a horizontal velocity parameter, a vertical velocity parameter, or longitudinal velocity parameter associated with the vehicle 106, (iii) at least one of a yaw parameter, a pitch parameter, or a roll parameter associated with the vehicle 106.

As depicted in FIG. 1, the sensor data received from the one or more sensors 102 in association with a time t may be used to generate tth sensor observation data 110. The tth sensor observation data 110 may include N sensor observations, such as the first sensor observation 110(1), the second sensor observation 110(2), and the nth sensor observation 110(N). A sensor observation may represent a detection of the vehicle 106 based on sensor data associated with the tth time. In some cases, a sensor observation is determined by processing at least a portion of sensor data associated with a tth time (e.g., sensor data representing the vehicle 106) using a model (e.g., a machine learning model). In some cases, a sensor observation is determined by processing sensor data associated with two or more sensor modalities using a machine learning model. In some cases, a sensor observation represents an object detection and/or a detected track.

In some cases, a sensor observation includes at least one of a lidar-based observation determined based on lidar data, a radar-based observation determined based on radar data, a sonar-based observation determined based on sonar data, an image-based observation determined based on image data, or one or more observations determined by detecting correlations across the lidar data, the radar data, the sonar data, and the image data.

In some cases, sensor observation data include at least one of the following: one or more single-modality observations or one or more cross-modality observations. A single-modality observation may be a sensor observation that is determined based on sensor data associated with a single sensor modality, for example by detecting an object in a region of the sensor data associated with the single sensor modality. In some cases, a cross-modality observation may be a sensor observation that is determined based on sensor data associated with more than one sensor modality. In some cases, given a set of sensor modalities associated with the sensors of a vehicle, the sensor data captured by all of the described sensor modalities at a first time may be collectively processed by a machine learning model (e.g., a deep tracking network machine learning model) to determine a set of cross-modality observations for the respective vehicle environment.

As further depicted in FIG. 1, the tth sensor observation data 110 associated with the time t is processed using a first perception model component 112 to generate tth context data 114 associated with the time t. In some cases, the first perception model component 112 may be an attention-based model that uses an attention mechanism (e.g., a self-attention mechanism) to process the set of sensor observations associated with the tth sensor observation data 110 to determine tth context data 114 (e.g., a context vector). For example, the first perception model component 112 may determine the tth context data 114 by processing the sensor observations in the tth sensor observation data 110 using one or more self-attention layers. The self-attention layers may enable the first perception model component 112 to focus on relevant observations and ignore irrelevant observations when determining the tth context data 114.

The tth context data 114 may be a fixed-size representation of the sensor observations associated with the tth sensor observation data 110. For example, the tth context data 114 may be a fixed-size context vector. In some cases, the context vector represents a state of the vehicle environment 108 at time t. The context vector may, for example, represent one or more features extracted from the sensor observations associated with the tth sensor observation data 110. For example, the context vector may represent at least one of: (i) number, positions, orientations, and/or velocities of detected objects in the vehicle environment 108, (ii) the spatial relationships of the detected objects, (iii) relevant map information (e.g., lane positions, traffic light positions, drivable and/or non-drivable surfaces), or (iv) the position, orientation, and/or velocity of the vehicle 104 at time t. In some cases, the context vector includes a scene representation with spatial and/or semantic features associated with the objects detected in the environment.

As further depicted in FIG. 1, the tth context data 114 associated with the time t may be processed by the second perception model component 116 to generate the tth hidden state representation 122 associated with the time t. In some cases, the tth context data 114 is provided as input to the second perception model component 116, which may be a multi-modal perception model such as a mixture density network (MDN). Based on the tth context data 114, the second perception model component 116 may generate tth hidden state representation 122. The tth output data may include a set of probability distributions associated with the predicted state of the vehicle 106. For example, the second perception model component 116 may determine M probability distributions, each representing a different hypothesis about one or more features (e.g., the position, velocity, orientation, and/or the like) of the vehicle 106. In some cases, the second perception model component 116 generates M weights for the M probability distributions. In some cases, the MDN is characterized by a current architecture.

For example, as depicted in FIG. 1, the tth context data 114 includes the tth hypothesis set 124. The tth hypothesis set includes four weights associated with four probability distributions, where each probability distribution is associated with a respective vector and where the length of the respective vector represents a weight associated with the corresponding probability distribution. For example, the four probability distributions may be associated with four hypothesized orientations (e.g., yaws) for the vehicle 106 at time t. Accordingly, in some cases, the tth hypothesis set 124 represents: (i) four hypothesized orientations for the vehicle 106 at time t, (ii) that the hypothesized orientation associated with the downward vector has the highest weight, (iii) that the hypothesized orientation associated with the upward vector has the second-highest weight, (iv) that the hypothesized orientation associated with the rightward vector has the third-highest weight, and (v) that the hypothesized orientation associated with the leftward vector has the lowest weight.

As another example, the four probability distributions may be associated with four hypothesized movement directions for the vehicle 106. Accordingly, in some cases, the tth hypothesis set 124 represents: (i) four hypothesized movement directions for the vehicle 106, (ii) that the hypothesized movement direction associated with the downward vector has the highest weight, (iii) that the hypothesized movement direction associated with the upward vector has the second-highest weight, (iv) that the hypothesized movement direction associated with the rightward vector has the third-highest weight, and (v) that the hypothesized movement direction associated with the leftward vector has the lowest weight.

As further depicted in FIG. 1, the second perception model component 116 determines the tth hidden state representation 122 based on the (t−1)th hidden state representation 118 associated with a preceding time (t−1). The tth hidden state representation 122 may be the output of the second perception model component 116 at the preceding time (t−1), for example as determined based on: (i) (t−1)th sensor context data (e.g., determined based on the (t−1)th sensor observation data, where the (t−1)th sensor observation data may be determined based on the (t−1)th sensor data associated with the preceding time (t−1)), and/or (ii) the (t−2)th hidden state representation determined by the second perception model component 116 for a time (t−2). Accordingly, the second perception model component 116 may be a recurrent model that uses the output of a preceding timestep to generate a hidden state input that is provided as an input to a current timestep. In some cases, a hidden state representation generated by the second perception model component 116 for a timestep is an encoded representation of a parameterized multimodal probability distribution, where the parameterized multimodal probability distribution may represent a set of distributions about a predicted state of an object in the environment and/or a weight (e.g., parameter) for each distribution.

In some cases, both the tth hidden state representation 122 and the (t−1)th hidden state representation 118 represent parameterized multimodal probability distributions that represent weights for a common number of probability distributions about a predicted state of the vehicle 106, where the common number may be determined based on a hyper-parameter of the second perception model component 116 that is set during inference and/or training (e.g., a hyper-parameter defining the count of the probability distributions). In some cases, the parameterized multimodal probability distribution represented by the (t−1)th hidden state representation 118 represents a first set of weights for the probability distributions as determined based on the (t−1)th sensor observation data, and the parameterized multimodal probability distribution represented by the tth hidden state representation 122 represents an updated set of weights that are determined by updating the first set of weights based on the tth context data 114. Accordingly, in some cases, the (t−1)th hidden state representation 118 represents M weights for M probability distributions about the predicted state of the vehicle 106.

As further depicted in FIG. 1, the tth hidden state representation 122 generated by the second perception model component may be processed by a third perception model component 132 to generate the tth output data 134 associated with the time t. The tth output data 134 may include a parameterized multimodal probability distribution determined based on the tth hidden state representation 122.

For example, as depicted in FIG. 1, the tth output data 134 may include the tth hypothesis set 124. The tth hypothesis set 124 includes four weights associated with four probability distributions, where each probability distribution is associated with a respective vector and where the length of the respective vector represents a weight associated with the corresponding probability distribution. For example, the four probability distributions may be associated with four hypothesized orientations (e.g., yaws) for the vehicle 106 at time t. Accordingly, in some cases, the tth hypothesis set 124 represents: (i) four hypothesized orientations for the vehicle 106 at time t, (ii) that the hypothesized orientation associated with the upward vector has the highest weight, (iii) that the hypothesized orientation associated with the downward vector has the second-highest weight, (iv) that the hypothesized orientation associated with the leftward vector has the third-highest weight, and (v) that the hypothesized orientation associated with the rightward vector has the lowest weight.

As another example, the four probability distributions may be associated with four hypothesized movement directions for the vehicle 106 at time t. Accordingly, in some cases, the tth hypothesis set 124 represents: (i) four hypothesized movement directions for the vehicle 106 at time t, (ii) that the hypothesized movement direction associated with the upward vector has the highest weight, (iii) that the hypothesized movement direction associated with the downward vector has the second-highest weight, (iv) that the hypothesized movement direction associated with the leftward vector has the third-highest weight, and (v) that the hypothesized movement direction associated with the rightward vector has the lowest weight.

As further depicted in FIG. 1, the downstream model 126 processes the tth output data 134 to determine a perception output 128. The perception output 128 may represent a conclusion about: (i) whether a predicted state (e.g., a predicted orientation and/or movement direction) of the vehicle 106 can be determined based on the tth output data 134, and/or (ii) a predicted state (e.g., a predicted orientation and/or movement direction) of the vehicle 106 as determined based on the tth output data 134.

For example, in some cases, the downstream model 126 may determine that, based on the tth output data 134, a definitive predicted state of the vehicle 106 cannot be determined (e.g., because no probability distributions exceed a threshold and/or because a deviation between the last N mixture models generated by the second perception model component 116 exceeds a threshold). As another example, in some cases, the downstream model 126 may determine the perception output 128 based on an expected value of the predicted state, for example based on a weighted sum of the means of the probability distributions described by the tth output data. As another example, in some cases, the downstream model 126 may determine the perception output 128 based on the probability distribution with the highest weight as represented by the tth output data 134. As an additional example, in some cases, the downstream model 126 may determine the perception output 128 based on the probability distribution with the highest weight as represented by the tth output data 134 if one or more conditions are met (e.g., if the weight for the highest-weighted probability distribution, as represented by the tth output data 134, exceeds a threshold, and/or if because a deviation between the last N mixture models generated by the second perception model component 116 equals or falls below a threshold).

In the example depicted in FIG. 1, the downstream model 126 has determined the conclusion 130 about the predicted state of the vehicle 106. As depicted in FIG. 1, the conclusion 130 adopts the probability distribution associated with the upward vector as the predicted state of the vehicle 106. This adoption may be because the tth output data 134 indicates that the probability distribution associated with the upward vector has the highest vector. The adoption of the probability distribution associated with the upward vector as the predicted state of the vehicle 106 may alternatively or additionally be based on determining that the weight associated with the upward probability distribution, as indicated by the tth output data 134, exceeds a threshold.

The perception output 128 may represent a conclusion about the predicted state of the vehicle 106 at time t. This predicted state may be used by other components of the vehicle computing device associated with the vehicle 104, such as by a prediction component to predict about a future behavior of the vehicle 106, and/or by a planner component to generate a trajectory for the vehicle 104 to traverse the vehicle environment 108. The vehicle computing device may cause the vehicle 104 to traverse an environment based on the selected trajectory.

Figure 2:
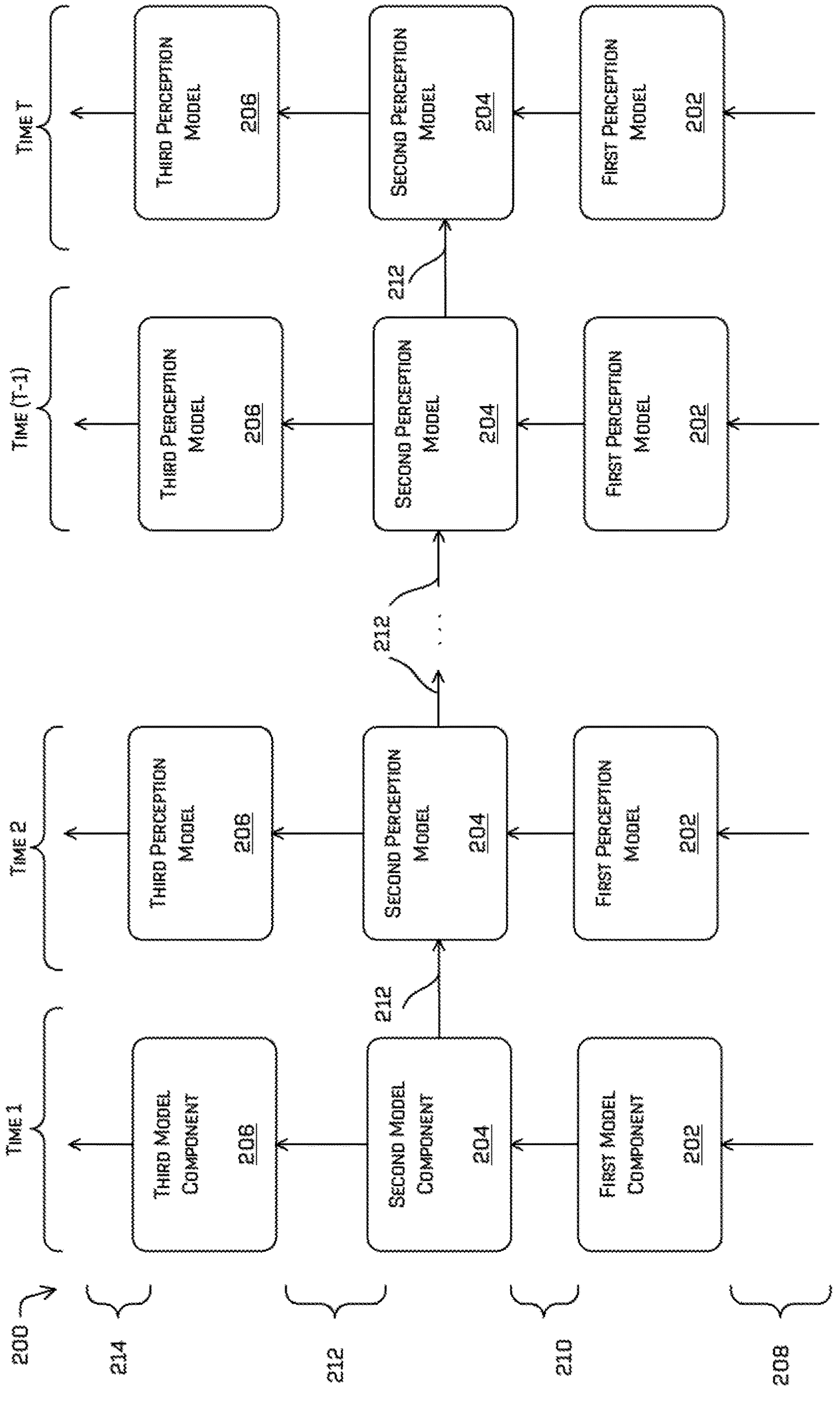
FIG. 2 provides an operational example of an architecture for a recurrent multi-modal perception network.

FIG. 2 provides an operational example of an architecture 200 for a recurrent multi-modal perception network. As depicted in FIG. 2, the recurrent multi-modal perception network executes T iterations associated with the T times. The T times may correspond to the number of batches of sensor observation data received between a time associated with a first detection of an object (e.g., a first time) and a time associated with satisfaction of a terminating condition (e.g., a time associated with a last detection of an object, a time associated with a first determination that the object is no longer of interest and/or of relevance to the vehicle, a time associated with a first determination that a distance between the object and the vehicle exceeds a threshold, a time associated with a first determination that the paths associated with the vehicle and the object are not likely to collide, and/or the like).

As depicted in FIG. 2, at each ath time (e.g., for each a selected from the {1, . . . . T}), the recurrent multi-modal perception network: (i) processes the sensor observation data 208 associated with the ath time using a first perception model component 202 to determine context data 210 associated with the ath time, (ii) processes the context data 210 associated with the ath time using a second perception model component 204 to determine a hidden state representation 212 associated with the ath time (e.g., a set of probability distributions about a predicted state of an object at the ath time and/or a set of weights associated with the set of probability distributions), and (iii) processes the hidden state representation 212 associated with the ath time using a third perception model component 206 to generate a parameterized multimodal distribution 214 associated with the ath time.

As further depicted in FIG. 2, at each bth time except for the first time (e.g., for each b selected from the {2, . . . , T}), the recurrent multi-modal perception network uses the hidden state representation 212 associated with the (b−1)th time as an input for the second perception model component 204. Accordingly, at time T, the second perception model component 204 receives the hidden state representation 212 associated with the time (T−1) as an input, and at the second time, the second perception model component 204 receives the hidden state representation 212 associated with the first time as an input.

Figure 3:
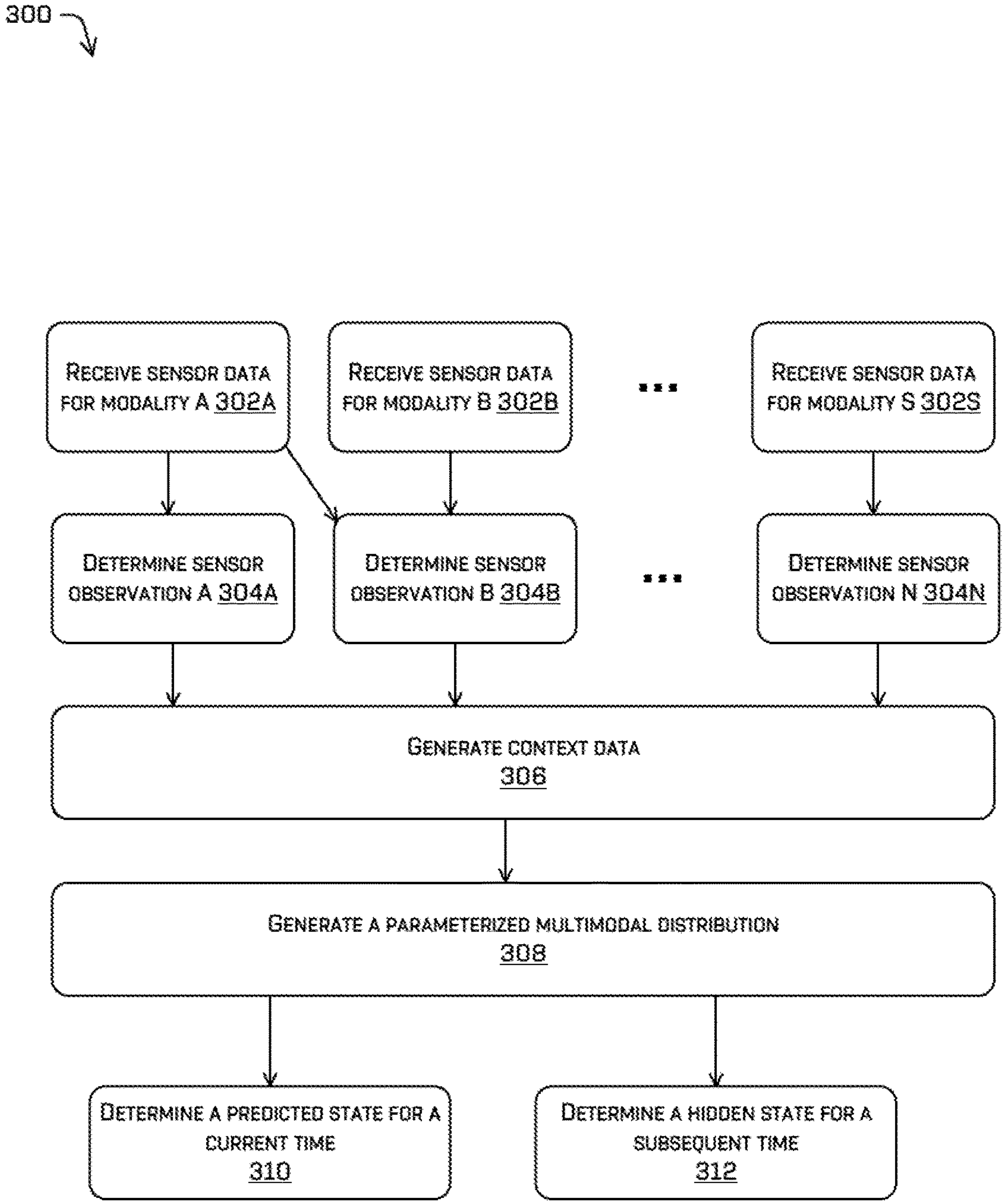
FIG. 3 is a flowchart diagram of an example process for determining a predicted state of an object in a vehicle environment at a current time using a recurrent multi-modal perception model.

FIG. 3 is a flowchart diagram of an example process 300 for determining a predicted state of an object in a vehicle environment at a current time using a recurrent multi-modal perception model. As depicted in FIG. 3, at operations 302A-302S, an example system receives sensor data associated with the current time from S sensors associated with S sensor modalities. For example, at operation 302A, the system receives sensor data associated with the current time from sensor(s) associated with a sensor modality A. As another example, at operation 302B, the system receives sensor data associated with the current time from sensor(s) associated with a sensor modality B. As another example, at operation 302S, the system receives sensor data associated with the current time from sensor(s) associated with a sensor modality S. Examples of sensor modalities include lidar, radar, sonar, and/or an image sensor (e.g., an image sensor including at least one of a visible light spectrum camera, a depth camera, an infrared camera, and/or the like).

At operations 304A-304N, the system determines N sensor observations based on the sensor data received at operations 302A-302-S. For example, at operation 304A, the system determines a sensor observation A based on sensor data associated with the sensor modality A. As another example, at operation 304B, the system determines a sensor observation B based on sensor data associated with the sensor modality A and the sensor data associated with the sensor modality B. As an additional example, at operation 304N, the system determines a sensor observation N based on sensor data associated with the sensor modality N.

Examples of sensor observations include single-modality sensor observations that are determined based on sensor data associated with a single modality and multi-modality sensor observations that are determined based on sensor data associated with two or more modalities. In some cases, a sensor observation is determined by processing one or more sensor data fields using a machine learning model (e.g., an encoder model that is configured to generate a fixed-size representation of sensor data associated with one or more modalities).

At operation 306, the system determines context data based on the N sensor observations. The context data may be a fixed-size representation determined by processing the N sensor observations using an attention mechanism (e.g., using a self-attention mechanism). In some cases, the context data includes a context vector. The context vector may, for example, represent one or more features extracted from the N sensor observations.

At operation 308, the system determines a parameterized multimodal distribution associated with the current time based on the context data associated with the current time. The parameterized multimodal distribution may represent at least one of: (i) M probability distribution about the predicted state of an object at the current time, and (ii) M weights associated with the M probability distributions. The predicted state may be defined over a state space defined with one or more variables. For example, a variable may represent one or more of: (i) at least one of a horizontal position parameter, a vertical position parameter, or longitudinal position parameter associated with the object, (ii) at least one of a horizontal velocity parameter, a vertical velocity parameter, or longitudinal velocity parameter associated with the object, (iii) at least one of a yaw parameter, a pitch parameter, or a roll parameter associated with the object.

In some cases, the system determines the parameterized multimodal distribution based on the context data associated with a current time and the parameterized multimodal distribution associated with a preceding time. In some cases, to determine the parameterized multimodal distribution associated with the current time, the system processes the context data associated with the current time and the parameterized multimodal distribution associated with the preceding time using a recurrent multi-modal perception model and determines the parameterized multimodal distribution associated with the current time based on the output of the recurrent multi-modal perception model.

At operation 310, the system determines a predicted object state associated with the current time based on the parameterized multimodal distribution associated with the current time. For example, the system may determine the predicted object state based on the probability distribution having the highest weight (e.g., if the weight exceeds a threshold). As another example, the system may determine the predicted object state based on a weighted sum of the set of M weighted probability distributions associated with the current time.

At operation 312, the system determines hidden state data for a subsequent time based on the set of M weighted probability distributions associated with the current time. For example, the system may adopt the parameterized multimodal distribution associated with the current time as a hidden state input that may be processed by a recurrent multi-modal perception model during the model iteration associated with the subsequent time. As another example, the system may process the parameterized multimodal distribution associated with the current time to generate a hidden state input for a recurrent multi-modal perception model, where the hidden state input may be processed by the recurrent multi-modal perception model during the model iteration associated with the subsequent time.

Figure 4:
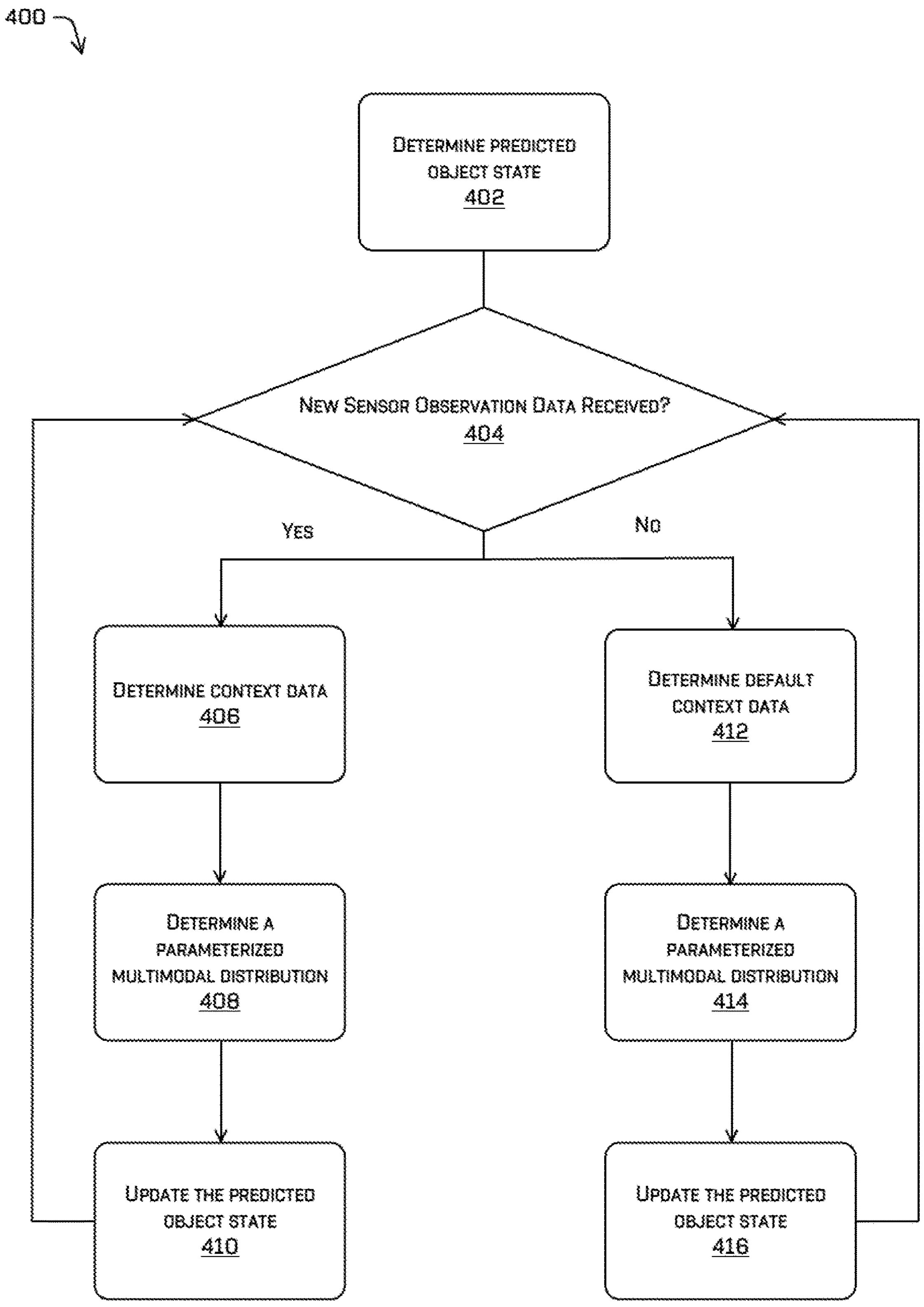
FIG. 4 is a flowchart diagram of an example process for iteratively determining a predicted state for an object in an environment.

FIG. 4 is a flowchart diagram of an example process 400 for iteratively determining a predicted state for an object in an environment. As depicted in FIG. 4, at operation 402, an example system determines an initial predicted object state. The initial predicted object state may be a default object state and/or a predicted object state that is determined by a perception model that is upstream to the recurrent network performing the process 400.

At operation 404, the system determines whether new sensor observation data is received. In some cases, the system determines whether a new batch of sensor data is received and/or a new batch of sensor observations is determined (e.g., based on a new batch of sensor data). In some cases, a sensor observation is determined by processing one or more sensor data fields using a machine learning model (e.g., an encoder model that is configured to generate a fixed-size representation of sensor data associated with one or more modalities).

Based on determining that new sensor observation data is received (operation 404—Yes), the system proceeds to operation 406 to determine context data based on the newly received sensor observation data. The context data may be a fixed-size representation determined by processing the sensor observations associated with the newly received sensor observation data using an attention mechanism (e.g., using a self-attention mechanism). In some cases, the context data includes a context vector.

After operation 406, at operation 408, the system determines a first parameterized multimodal distribution based on the context data determined at operation 406. The first parameterized multimodal distribution may represent at least one of: (i) M probability distribution about the predicted state of an object at a time associated with the newly received observation data, and (ii) M weights associated with the M probability distributions.

After operation 408, at operation 410, the system updates the predicted object state based on the first parameterized multimodal distribution determined at operation 408. For example, the system may determine the predicted object state based on the probability distribution having the highest weight (e.g., if the weight exceeds a threshold). As another example, the system may determine the predicted object state based on a weighted sum of the set of M weighted probability distributions associated with the current time as represented by the first parameterized multimodal distribution.

Based on determining that new sensor observation data is not received (operation 404—No), the system proceeds to operation 412 to determine default context data (e.g., all-zero context data, such as an all-zero context vector). At operation 414, the system determines a second parameterized multimodal distribution based on the default context data determined at operation 412. The second parameterized multimodal distribution may represent at least one of: (i) M probability distribution about the predicted state of an object at a time associated with the newly received observation data, and (ii) M weights associated with the M probability distributions.

After operation 414, at operation 416, the system updates the predicted object state based on the second parameterized multimodal distribution determined at operation 414. For example, the system may determine the predicted object state based on the probability distribution having the highest weight (e.g., if the weight exceeds a threshold). As another example, the system may determine the predicted object state based on a weighted sum of the set of M weighted probability distributions associated with the current time as represented by the second parameterized multimodal distribution.

Figure 5:
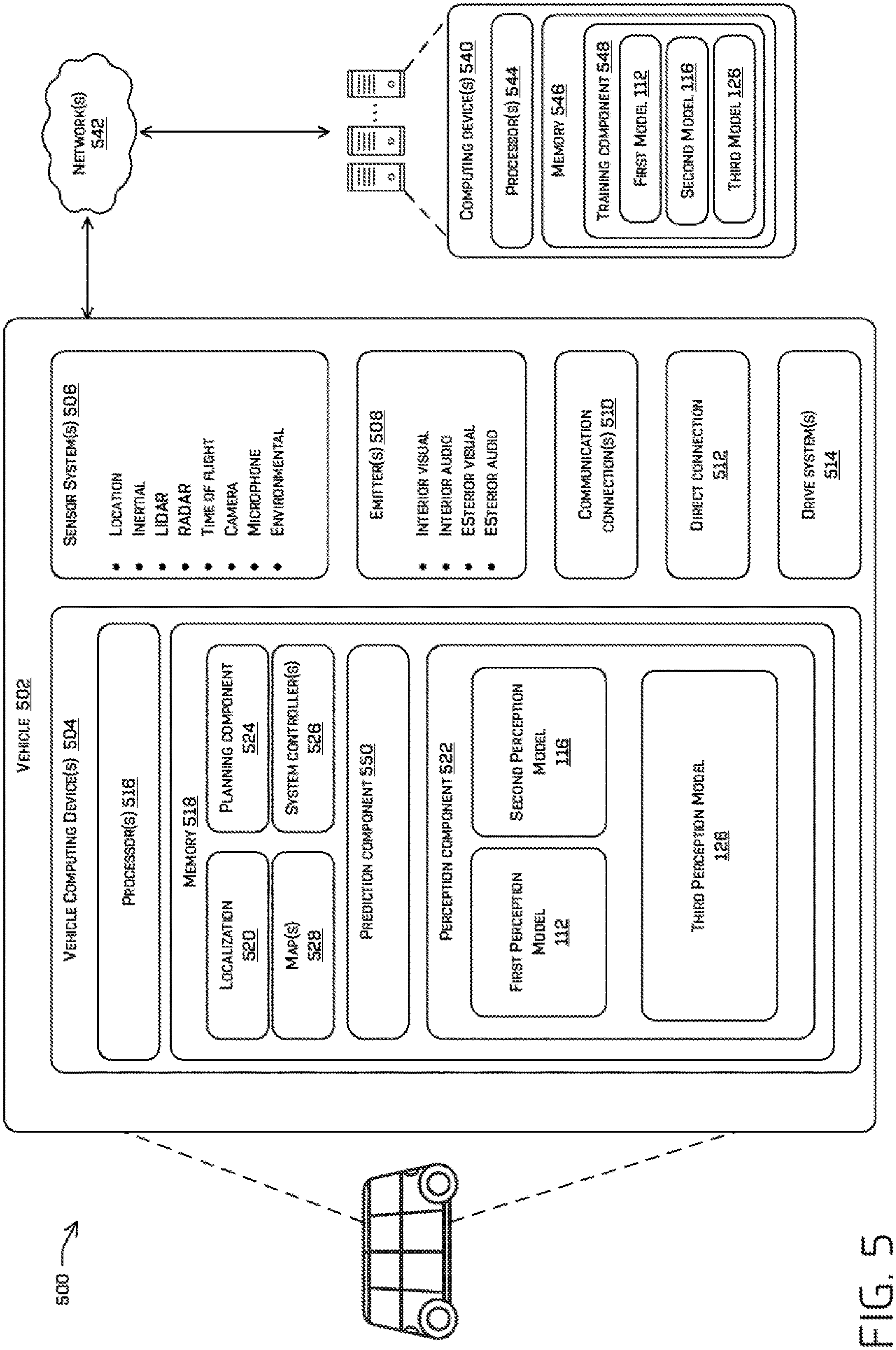
FIG. 5 depicts a block diagram of an example system for implementing the techniques described herein.

FIG. 5 depicts a block diagram of an example system 500 for implementing the techniques described herein. In at least one example, the system 500 may include a vehicle 502.

The vehicle 502 may include a vehicle computing device 504, one or more sensor systems 506, one or more emitters 508, one or more communication connections 510, at least one direct connection 512, and one or more drive systems 514.

The vehicle computing device 504 may include one or more processors 516 and memory 518 communicatively coupled with the one or more processors 516. In the illustrated example, the vehicle 502 is an autonomous vehicle; however, the vehicle 502 could be any other type of vehicle. In the illustrated example, the memory 518 of the vehicle computing device 504 stores a localization component 520, a perception component 522, a planning component 524, a prediction component 550, one or more system controllers 526, and one or more maps 528. Though depicted in FIG. 5 as residing in memory 518 for illustrative purposes, it is contemplated that the localization component 520, the perception component 522, the planning component 524, the prediction component 550, the one or more system controllers 526, and the one or more maps 528 may additionally, or alternatively, be accessible to the vehicle 502 (e.g., stored remotely).

In at least one example, the localization component 520 may include functionality to receive data from the sensor system(s) 506 to determine a position of the vehicle 502. For example, the localization component 520 may include and/or request/receive a three-dimensional map of an environment and may continuously determine a location of the autonomous vehicle within the map. In some instances, the localization component 520 may utilize SLAM (simultaneous localization and mapping) or CLAMS (calibration, localization and mapping, simultaneously) to receive image data, lidar data, radar data, IMU data, GPS data, wheel encoder data, and the like to accurately determine a location of the autonomous vehicle. In some instances, the localization component 520 may provide data to various components of the vehicle 502 to determine an initial position of an autonomous vehicle for generating a candidate trajectory.

In some instances, the perception component 522 may include functionality to perform object detection, segmentation, and/or classification. In some examples, the perception component 522 may provide processed sensor data that indicates a presence of an entity that is proximate to the vehicle 502 and/or a classification of the entity as an entity type (e.g., car, pedestrian, cyclist, building, tree, road surface, curb, sidewalk, unknown, road feature, etc.). In examples, the perception component 522 may process sensor data to identify a road feature (e.g., an intersection, parking lane, signal light, stop sign, etc.), determine a proximity of the road feature to the vehicle 502, and/or provide data regarding the road feature (e.g., proximity, etc.) as processed sensor data. In additional and/or alternative examples, the perception component 522 may provide processed sensor data that indicates one or more characteristics associated with a detected entity and/or the environment in which the entity is positioned. In some examples, characteristics associated with an entity may include, but are not limited to, an x-position, a y-position, a z-position, an orientation, an entity type (e.g., a classification), a velocity of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

In examples, the planning component 524 may determine a path for the vehicle 502 to follow to traverse through an environment. For example, the planning component 524 may determine various routes and trajectories and various levels of detail. For example, the planning component 524 may determine a route to travel from a first location (e.g., a current location) to a second location (e.g., a target location). For the purpose of this discussion, a route may be a sequence of waypoints for travelling between two locations. As non-limiting examples, waypoints include streets, intersections, GPS coordinates, etc. Further, the planning component 524 may generate an instruction for guiding the autonomous vehicle along at least a portion of the route from the first location to the second location. In at least one example, the planning component 524 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique.

In at least one example, the one or more system controllers 526 may be configured to control steering, propulsion, braking, safety, emitters, communication, and other systems of the vehicle 502. The system controller(s) 526 may communicate with and/or control corresponding systems of the drive system(s) 514 and/or other components of the vehicle 502.

The memory 518 may further include the one or more maps 528 that may be used by the vehicle 502 to navigate within the environment. For example, a map may be any number of data structures modeled in two dimensions or three dimensions that are capable of providing information about an environment, such as, but not limited to, topologies (such as intersections), streets, mountain ranges, roads, terrain, and the environment in general. In one example, a map may include a three-dimensional mesh. In some instances, the map may be stored in a tiled format, such that individual tiles of the map represent a discrete portion of an environment, and may be loaded into working memory as needed. In some instances, the map(s) 528 may be divided into tiles by the vehicle computing device 504, by a computing device(s) 540, or by a combination of the two.

In some examples, the one or more maps 528 may be stored on a remote computing device(s) (such as the computing device(s) 540) accessible via network(s) 542. In some examples, multiple maps 528 may be stored based on, for example, a characteristic (e.g., type of entity, time of day, day of week, season of the year, etc.). Storing multiple maps 528 may have similar memory requirements, but increase the speed at which data in a heat map may be accessed.

In some instances, aspects of some or all of the components discussed herein may include any models, algorithms, and/or machine learning algorithms. For example, in some instances, the components in the memory 518 may be implemented as a neural network.

As described herein, an exemplary neural network passes input data through a series of connected layers to produce an output. Each layer in a neural network may also include another neural network, or may include any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

In at least one example, the sensor system(s) 506 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 506 may include multiple instances of each of these or other types of sensors. For instance, the lidar sensors may include individual lidar sensors located at the corners, front, back, sides, and/or top of the vehicle 502. As another example, the camera sensors may include multiple cameras disposed at various locations about the exterior and/or interior of the vehicle 502. The sensor system(s) 506 may provide input to the vehicle computing device 504. Additionally, and/or alternatively, the sensor system(s) 506 may send sensor data, via the one or more networks 542, to the one or more computing device(s) 540 at a particular frequency, after a lapse of a predetermined period of time, in near real-time, etc.

The vehicle 502 may also include the one or more emitters 508 for emitting light and/or sound, as described above. The emitters 508 in this example include interior audio and visual emitters to communicate with passengers of the vehicle 502. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may include acoustic beam steering technology.

The vehicle 502 may also include the one or more communication connection(s) 510 that enable communication between the vehicle 502 and one or more other local or remote computing device(s). For instance, the communication connection(s) 510 may facilitate communication with other local computing device(s) on the vehicle 502 and/or the drive system(s) 514. Also, the communication connection(s) 510 may allow the vehicle to communicate with other nearby computing device(s) (e.g., other nearby vehicles, traffic signals, etc.). The communication connection(s) 510 also enable the vehicle 502 to communicate with a remote teleoperations computing device or other remote services.

The communications connection(s) 510 may include physical and/or logical interfaces for connecting the vehicle computing device 504 to another computing device or a network, such as the network(s) 542. For example, the communications connection(s) 510 may enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 may include the one or more drive systems 514. In some examples, the vehicle 502 may have a single drive system 514. In at least one example, if the vehicle 502 has multiple drive systems 514, individual drive systems 514 may be positioned on opposite ends of the vehicle 502 (e.g., the front and the rear, etc.). In at least one example, the drive system(s) 514 may include one or more sensor systems to detect conditions of the drive system(s) 514 and/or the surroundings of the vehicle 502. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 514. In some cases, the sensor system(s) on the drive system(s) 514 may overlap or supplement corresponding systems of the vehicle 502 (e.g., sensor system(s) 506).

The drive system(s) 514 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 514. Furthermore, the drive system(s) 514 also include one or more communication connection(s) that enable communication by the respective drive module with one or more other local or remote computing device(s).

In at least one example, the localization component 520, perception component 522, and/or the planning component 524 may process sensor data, as described above, and may send their respective outputs, over the one or more network(s) 542, to the one or more computing device(s) 540. In at least one example, the localization component 520, the perception component 522, and/or the planning component 524 may send their respective outputs to the one or more computing device(s) 540 at a particular frequency, after a lapse of a predetermined period of time, in near real-time, etc.

The vehicle 502 may send sensor data to the one or more computing device(s) 540, via the network(s) 542. In some examples, the vehicle 502 may send raw sensor data to the computing device(s) 540. In other examples, the vehicle 502 may send processed sensor data and/or representations of sensor data to the computing device(s) 540. In some examples, the vehicle 502 may send sensor data to the computing device(s) 540 at a particular frequency, after a lapse of a predetermined period of time, in near real-time, etc. In some cases, the vehicle 502 may send sensor data (raw or processed) to the computing device(s) 540 as one or more log files. The computing device(s) 540 may receive the sensor data (raw or processed) and may generate and/or update maps based on the sensor data.

In examples, the vehicle 502 may generate various log file(s) representing sensor data captured by the vehicle 502. For example, a log file may include, but is not limited to, sensor data captured by one or more sensors of the vehicle 502 (e.g., lidar sensors, radar sensors, sonar sensors, wheel encoders, inertial measurement units (IMUs) (which may include gyroscopes, magnetometers, accelerometers, etc.), GPS sensors, image sensors, and the like), route information, localization information, and the like. In some cases, a log file(s) may include a log of all sensor data captured by the vehicle 502, decisions made by the vehicle 502, determinations made regarding segmentation and/or classification, and the like. A log files(s) may be sent to and received by the computing device(s) 540.

In at least one example, the computing device(s) 540 may include one or more processors 544 and memory 546 communicatively coupled with the one or more processors 544. In the illustrated example, the memory 546 stores a training component 548 that may train the machine learning models 536A-536C according to any of the techniques discussed herein. The training component 548 may train the machine learning models 536A-536C at any time, such as while offline, and then send the machine learning models 536A-536C to the vehicle 502 over the network(s) 542 to be implemented by the vehicle 502. In some cases, once trained, the machine learning models 536A-536C are deployed on the vehicle computing device 504, and operations of machine learning models 536A-536C are performed by the vehicle computing device 504. In some cases, once trained, the machine learning models 536A-536C are deployed on the computing device 540, operations of the machine learning models 536A-536C are performed by the computing device 540 to generate predictions, and then predictions are transmitted to the prediction component 550 of the vehicle computing device 504.

Although illustrated as being implemented on the computing device(s) 540, the training component 548 may be implemented on the vehicle 502, such as stored within the memory 518 of the vehicle computing device 504 and executed by the processor(s) 516 of the vehicle computing device 504. Further, any of the components of the vehicle computing device(s) 504 may alternatively, or additionally, be implemented by the computing device(s) 540.

The processor(s) 516 of the vehicle 502 and the processor(s) 544 of the computing device(s) 540 may be any suitable processor capable of executing instructions to process data and perform operations as described herein. By way of example and not limitation, the processor(s) 516 and 544 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 518 and memory 546 are examples of non-transitory computer-readable media. Memory 518 and memory 546 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 5 is illustrated as a distributed system, in alternative examples, components of the vehicle 502 may be associated with the computing device(s) 540 and/or components of the computing device(s) 540 may be associated with the vehicle 502. That is, the vehicle 502 may perform one or more of the functions associated with the computing device(s) 540, and vice versa.

EXAMPLE CLAUSES

A: A system comprising: one or more processors; and one or more non-transitory computer-readable media storing computer-executable instructions that, when executed, cause the one or more processors to perform operations comprising: receiving first sensor data associated with a first sensor and second sensor data associated with a second sensor, wherein: the first sensor data and the second sensor data are associated with a first time, and the first sensor data and the second sensor data represent that an object is in an environment of an autonomous vehicle; providing the first sensor data and the second sensor data to a first portion of a perception model, wherein the first portion processes the first sensor data and the second sensor data using a self-attention mechanism to determine first context data; receiving, from the first portion, the first context data; providing the first context data to a second portion of the perception model; receiving, from the second portion, first output data, wherein the first output data represents a first probability distribution associated with a first predicted state of the object at the first time, a second probability distribution associated with a second predicted state of the object at the first time, a first weight associated with the first probability distribution, and a second weight associated with the second probability distribution; receiving third sensor data associated with the first sensor and fourth sensor data associated with the second sensor, wherein the third sensor data and the fourth sensor data are associated with a second time; providing the third sensor data and the fourth sensor data to the first portion; receiving, from the first portion, second context data; providing the second context data and the first output data to the second portion; receiving, from the second portion, second output data, wherein the second output data represents a third probability distribution associated with a third predicted state of the object at the second time, a fourth probability distribution associated with a fourth predicted state of the object at the second time, a third weight associated with the third probability distribution, and a fourth weight associated with the fourth probability distribution; and controlling the autonomous vehicle based on the second output data.

B: The system of paragraph A, wherein the second portion comprises a mixture density network.

C: The system of paragraph A or B, wherein: the first output data represents a set of probability distributions comprising the first probability distribution and the second probability distribution, a count associated with the set of probability distributions is determined based on a hyper-parameter of the second portion, and the count represents a number of predictions about a state of the object that are evaluated by the second portion.

D: The system of any of paragraphs A-C, the operations further comprising: the first portion is configured to process an output of a second model, wherein a set of models comprising the first portion, the second portion, and the second model is trained end-to-end, and wherein validating the set of models comprises determining: a first validation score associated with the first portion and the second portion, and a second validation score associated with the second model.

E: The system of paragraph D, wherein the second portion is characterized by a recurrent architecture.

F: One or more non-transitory computer-readable media storing instructions executable by one or more processors, wherein the instructions, when executed, cause the one or more processors to perform operations comprising: determining first context data associated with an object in an environment of a vehicle, wherein the first context data is associated with a first time; determining, based on the first context data, first output data, wherein the first output data represents a first probability distribution associated with a first predicted state of the object at the first time, a second probability distribution associated with a second predicted state of the object at the first time, a first weight associated with the first probability distribution, and a second weight associated with the second probability distribution; determining second context data associated with the object in the environment, wherein the second context data is associated with a second time; determining, based on the first output data and the second context data, second output data, wherein the second output data represents a third probability distribution associated with a third predicted state of the object at the second time, a fourth probability distribution associated with a fourth predicted state of the object at the second time, a third weight associated with the third probability distribution, and a fourth weight associated with the fourth probability distribution; and controlling the vehicle based on the second output data.

G: The one or more non-transitory computer-readable media of paragraph F, wherein: the first context data is determined based on first sensor data associated with the first time; the first sensor data comprises first data associated with a first sensor having a first sensor modality and second data associated with a second sensor having a second sensor modality, and determining the first context data comprises processing the first data and the second data using a self-attention mechanism.

H: The one or more non-transitory computer-readable media of paragraph F or G, wherein determining the second context data comprises: processing the first output data and the second context data using a mixture density network.

I: The one or more non-transitory computer-readable media of any of paragraphs F-H, wherein: the first output data is determined using a model, the first output data represents a set of probability distributions comprising the first probability distribution and the second probability distribution, and a count associated with the set of probability distributions is determined based on a hyper-parameter of the model.

J: The one or more non-transitory computer-readable media of any of paragraphs F-I, wherein: the first predicted state represents a first mean and a first standard deviation associated with a predicted Gaussian distribution for the object over a state space, and the state space is defined by a set of state parameters comprising a position parameter, an orientation parameter, and a heading parameter.

K: The one or more non-transitory computer-readable media of any of paragraphs F-J, wherein: the first predicted state is defined over a state space; and the state space is defined by: at least one of a horizontal position parameter, a vertical position parameter, or longitudinal position parameter, at least one of a horizontal velocity parameter, a vertical velocity parameter, or longitudinal velocity parameter, and at least one of a yaw parameter, a pitch parameter, or a roll parameter.

L: The one or more non-transitory computer-readable media of any of paragraphs F-K, wherein controlling the vehicle comprises: determining at least one of: (i) that the third weight exceeds a first threshold, or (ii) that the fourth weight falls below a second threshold; determining a trajectory based on the third predicted state; and controlling the vehicle based on the trajectory.

M: The one or more non-transitory computer-readable media of any of paragraphs F-L, wherein the first output data represents a first Gaussian mixture model associated with the object.

N: A method comprising: determining first context data associated with an object in an environment of a vehicle, wherein the first context data is associated with a first time; determining, based on the first context data, first output data, wherein the first output data represents a first probability distribution associated with a first predicted state of the object at the first time, a second probability distribution associated with a second predicted state of the object at the first time, a first weight associated with the first probability distribution, and a second weight associated with the second probability distribution; determining second context data associated with the object in the environment, wherein the second context data is associated with a second time; determining, based on the first output data and the second context data, second output data, wherein the second output data represents a third probability distribution associated with a third predicted state of the object at the second time, a fourth probability distribution associated with a fourth predicted state of the object at the second time, a third weight associated with the third probability distribution, and a fourth weight associated with the fourth probability distribution; and controlling the vehicle based on the second output data.

O: The method of paragraph N, wherein: the first context data is determined based on first sensor data associated with the first time; the first sensor data comprises first data associated with a first sensor having a first sensor modality and second data associated with a second sensor having a second sensor modality, and determining the first context data comprises processing the first data and the second data using a self-attention mechanism.

P: The method of paragraph N or O, wherein determining the second context data comprises: processing the first output data and the second context data using a mixture density network.

Q: The method of any of paragraphs N-P, wherein: the first output data is determined using a model, the first output data represents a set of probability distributions comprising the first probability distribution and the second probability distribution, and a count associated with the set of probability distributions is determined based on a hyper-parameter of the model.

R: The method of any of paragraphs N-Q, wherein: the first predicted state represents a first mean and a first standard deviation associated with a predicted Gaussian distribution for the object over a state space, and the state space is defined by a set of state parameters comprising a position parameter, an orientation parameter, and a heading parameter.

S: The method of any of paragraphs N-R, wherein: the first predicted state is defined over a state space; and the state space is defined by: at least one of a horizontal position parameter, a vertical position parameter, or longitudinal position parameter, at least one of a horizontal velocity parameter, a vertical velocity parameter, or longitudinal velocity parameter, and at least one of a yaw parameter, a pitch parameter, or a roll parameter.

T: The method of any of paragraphs N-S, wherein controlling the vehicle comprises: determining at least one of: (i) that the third weight exceeds a first threshold, or (ii) that the fourth weight falls below a second threshold; determining a trajectory based on the third predicted state; and controlling the vehicle based on the trajectory.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

The invention claimed is:

1. A system comprising:

one or more processors; and one or more non-transitory computer-readable media storing computer-executable instructions that, when executed, cause the one or more processors to perform operations comprising:

receiving first sensor data associated with a first sensor and second sensor data associated with a second sensor, wherein:

the first sensor data and the second sensor data are associated with a first time, and the first sensor data and the second sensor data represent that an object is in an environment of an autonomous vehicle;

providing the first sensor data and the second sensor data to a recurrent neural network, wherein the recurrent neural network processes the first sensor data and the second sensor data using a self-attention mechanism to determine first context data;

receiving, from the recurrent neural network, the first context data;

providing the first context data to a gaussian mixture model;

receiving, from the gaussian mixture model, first output data, wherein the first output data represents a first set of probability distributions associated with predicting a first state of the object at the first time and a first set of weights associated with the first set of probability distributions, wherein the first set of probability distributions comprise a first probability distribution associated with a first predicted state of the object at the first time and a second probability distribution associated with a second predicted state of the object at the first time, and wherein the first set of weights comprise a first weight associated with the first probability distribution and a second weight associated with the second probability distribution;

receiving third sensor data associated with the first sensor and fourth sensor data associated with the second sensor, wherein the third sensor data and the fourth sensor data are associated with a second time after the first time;

providing the third sensor data and the fourth sensor data to the recurrent neural network;

receiving, from the recurrent neural network, second context data;

based at least in part on determining that the second time is after the first time and the first output data is associated with the first time, providing the second context data and the first output data representing the first set of probability distributions and the first set of weights to the gaussian mixture model, wherein the gaussian mixture model is configured to generate second output data based on processing the second context data and the first output data;

determining, as a higher weight, one of the first weight or the second weight;

determining that the higher weight exceeds a threshold;

one of:

outputting the first predicted state associated with the first probability distribution in response to the first weight being greater than the second weight and the first weight exceeding the threshold, or outputting the second predicted state associated with the second probability distribution in response to the second weight being greater than the first weight and the second weight exceeding the threshold;

receiving, from the gaussian mixture model, the second output data, wherein the second output data represents a second set of probability distributions associated with predicting a second state of the object at the second time and a second set of weights associated with the second set of probability distributions, wherein the second set of probability distributions comprise a third probability distribution associated with a third predicted state of the object at the second time and a fourth probability distribution associated with a fourth predicted state of the object at the second time, and wherein the second set of weights further comprise a third weight associated with the third probability distribution and a fourth weight associated with the fourth probability distribution; and controlling the autonomous vehicle based on the second output data.

2. The system of claim 1, wherein the gaussian mixture model is configured to determine hidden states for the object.

3. The system of claim 1, wherein:

the first output data represents a set of probability distributions comprising the first probability distribution and the second probability distribution, a count associated with the set of probability distributions is determined based on a hyper-parameter of the gaussian mixture model, and the count represents a number of predictions about a state of the object that are evaluated by the gaussian mixture model.

4. The system of claim 1, wherein:

the recurrent neural network is configured to process an output of a model, wherein a set of models comprising the recurrent neural network, the gaussian mixture model, and the model is trained end-to-end, and wherein validating the set of models comprises determining:

a first validation score associated with the recurrent neural network and the gaussian mixture model, and a second validation score associated with the model.

5. The system of claim 1, wherein the gaussian mixture model is configured to output a first hidden state and the first weight at the first time and a second hidden state and the second weight at the second time.

6. The system of claim 1, the operations further comprising:

determining that the first weight or the second weight does not exceed the threshold; and one of:

refraining from outputting the first predicted state associated with the first probability distribution in response to the first weight not exceeding the threshold, or refraining from outputting the second predicted state associated with the second probability distribution in response to the second weight not exceeding the threshold.

7. One or more non-transitory computer-readable media storing instructions executable by one or more processors, wherein the instructions, when executed, cause the one or more processors to perform operations comprising:

determining, based on processing first sensor data using a recurrent neural network, first context data associated with an object in an environment of a vehicle, wherein the first context data is associated with a first time;

determining, based on processing the first context data using a gaussian mixture model, first output data, wherein the first output data represents a first set of probability distributions associated with predicting a first state of the object at the first time and a first set of weights associated with the first set of probability distributions, wherein the first set of probability distributions comprise a first probability distribution associated with a first predicted state of the object at the first time and a second probability distribution associated with a second predicted state of the object at the first time, and wherein the first set of weights comprise a first weight associated with the first probability distribution and a second weight associated with the second probability distribution;

determining, based on processing second sensor data using the recurrent neural network, second context data associated with the object in the environment, wherein the second context data is associated with a second time after the first time;

determining, as a higher weight, one of the first weight or the second weight;

determining that the higher weight exceeds a threshold;

one of:

outputting the first predicted state associated with the first probability distribution in response to the first weight being greater than the second weight and the first weight exceeding the threshold, or outputting the second predicted state associated with the second probability distribution in response to the second weight being greater than the first weight and the second weight exceeding the threshold;

based at least in part on determining that the second time is after the first time and the first output data is associated with the first time, determining, based on processing the first output data and the second context data using the gaussian mixture model, second output data, wherein the second output data represents a second set of probability distributions associated with predicting a second state of the object at the second time and a second set of weights associated with the second set of probability distributions, wherein the second set of probability distributions comprise a third probability distribution associated with a third predicted state of the object at the second time and a fourth probability distribution associated with a fourth predicted state of the object at the second time, and wherein the second set of weights comprise a third weight associated with the third probability distribution and a fourth weight associated with the fourth probability distribution; and controlling the vehicle based on the second output data.

8. The one or more non-transitory computer-readable media of claim 7, wherein:

the first context data is determined based on the first sensor data associated with the first time;

the first sensor data comprises first data associated with a first sensor having a first sensor modality and second data associated with a second sensor having a second sensor modality, and determining the first context data comprises processing the first data and the second data using a self-attention mechanism.

9. The one or more non-transitory computer-readable media of claim 7, wherein determining the second context data comprises:

processing the first output data and the second context data using a mixture density network.

10. The one or more non-transitory computer-readable media of claim 7, wherein:

the first output data represents a set of probability distributions comprising the first probability distribution and the second probability distribution, and a count associated with the set of probability distributions is determined based on a hyper-parameter of the gaussian mixture model.

11. The one or more non-transitory computer-readable media of claim 7, wherein:

the first predicted state represents a first mean and a first standard deviation associated with a predicted Gaussian distribution for the object over a state space, and the state space is defined by a set of state parameters comprising a position parameter, an orientation parameter, and a heading parameter.

12. The one or more non-transitory computer-readable media of claim 7, wherein:

the first predicted state is defined over a state space; and the state space is defined by:

at least one of a horizontal position parameter, a vertical position parameter, or longitudinal position parameter, at least one of a horizontal velocity parameter, a vertical velocity parameter, or longitudinal velocity parameter, and at least one of a yaw parameter, a pitch parameter, or a roll parameter.

13. The one or more non-transitory computer-readable media of claim 7, wherein controlling the vehicle comprises:

determining at least one of: (i) that the third weight exceeds a first threshold, or (ii) that the fourth weight falls below a second threshold;

determining a trajectory based on the third predicted state; and controlling the vehicle based on the trajectory.

14. The one or more non-transitory computer-readable media of claim 7, wherein the first output data represents a first Gaussian mixture model associated with the object.

15. A method comprising:

determining, based on processing first sensor data using a recurrent neural network, first context data associated with an object in an environment of a vehicle, wherein the first context data is associated with a first time;

determining, based on processing the first context data using a gaussian mixture model, first output data, wherein the first output data represents a first set of probability distributions associated with predicting a first state of the object at the first time and a first set of weights associated with the first set of probability distributions, wherein the first set of probability distributions comprise a first probability distribution associated with a first predicted state of the object at the first time and a second probability distribution associated with a second predicted state of the object at the first time, and wherein the first set of weights comprise a first weight associated with the first probability distribution and a second weight associated with the second probability distribution;

determining, based on processing second sensor data using the recurrent neural network, second context data associated with the object in the environment, wherein the second context data is associated with a second time after the first time;

determining, as a higher weight, one of the first weight or the second weight;

determining that the higher weight exceeds a threshold;

one of:

outputting the first predicted state associated with the first probability distribution in response to the first weight being greater than the second weight and the first weight exceeding the threshold, or outputting the second predicted state associated with the second probability distribution in response to the second weight being greater than the first weight and the second weight exceeding the threshold;

based at least in part on determining that the second time is after the first time and the first output data is associated with the first time, determining, based on processing the first output data and the second context data using the gaussian mixture model, second output data, wherein the second output data represents a second set of probability distributions associated with predicting a second state of the object at the second time and a second set of weights associated with the second set of probability distributions, wherein the second set of probability distributions comprise a third probability distribution associated with a third predicted state of the object at the second time and a fourth probability distribution associated with a fourth predicted state of the object at the second time, and wherein the second set of weights comprise a third weight associated with the third probability distribution and a fourth weight associated with the fourth probability distribution; and controlling the vehicle based on the second output data.

16. The method of claim 15, wherein:

the first context data is determined based on the first sensor data associated with the first time;

the first sensor data comprises first data associated with a first sensor having a first sensor modality and second data associated with a second sensor having a second sensor modality, and determining the first context data comprises processing the first data and the second data using a self-attention mechanism.

17. The method of claim 15, wherein determining the second context data comprises:

processing the first output data and the second context data using a mixture density network.

18. The method of claim 15, wherein:

the first output data represents a set of probability distributions comprising the first probability distribution and the second probability distribution, and a count associated with the set of probability distributions is determined based on a hyper-parameter of the gaussian mixture model.

19. The method of claim 15, wherein:

the first predicted state represents a first mean and a first standard deviation associated with a predicted Gaussian distribution for the object over a state space, and the state space is defined by a set of state parameters comprising a position parameter, an orientation parameter, and a heading parameter.

20. The method of claim 15, wherein:

the first predicted state is defined over a state space; and the state space is defined by:

at least one of a horizontal position parameter, a vertical position parameter, or longitudinal position parameter, at least one of a horizontal velocity parameter, a vertical velocity parameter, or longitudinal velocity parameter, and at least one of a yaw parameter, a pitch parameter, or a roll parameter.

21. The method of claim 15, wherein controlling the vehicle comprises:

determining at least one of: (i) that the third weight exceeds a first threshold, or (ii) that the fourth weight falls below a second threshold;

determining a trajectory based on the third predicted state; and controlling the vehicle based on the trajectory.

* * * * *